May 26, 1942.
J. W. WEST
2,284,547
ELECTRICAL DEVICE
Filed Aug. 6, 1938
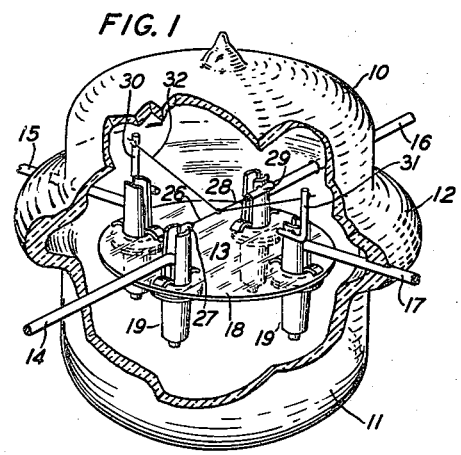
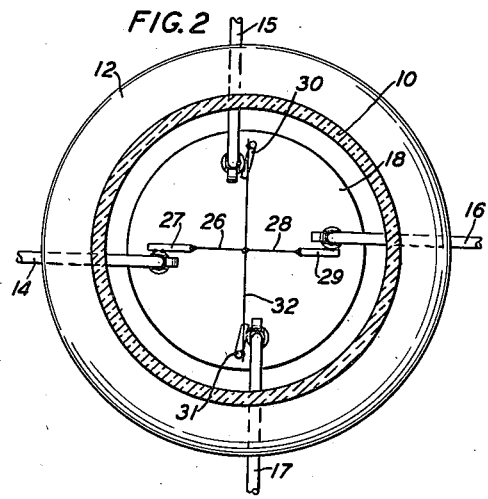
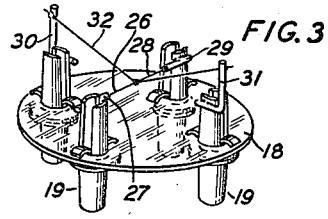
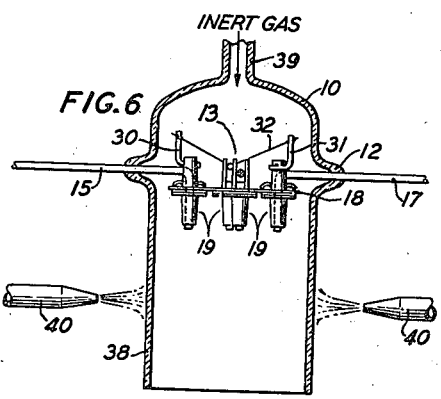
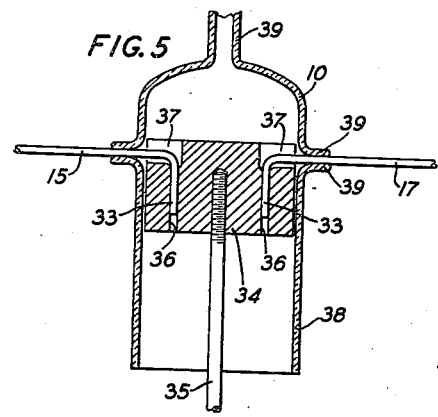
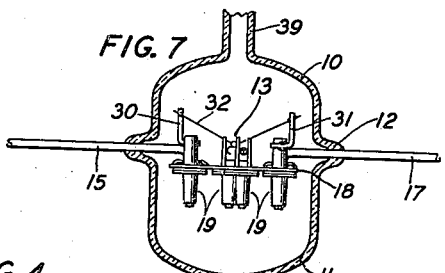
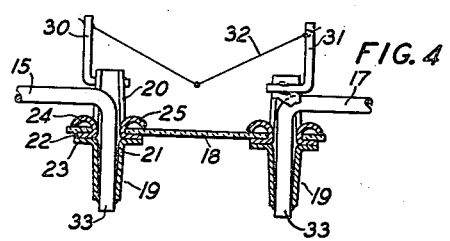
INVENTOR
J. W. WEST
BY
Walter C. Kiesel
ATTORNEY Patented May 26, 1942

2,284,547

UNITED STATES PATENT OFFICE 2,284,547

ELECTRICAL DEVICE

John W. West, Woodside, N. Y., assignor to Bell Telephone Laboratories, Incorporated, New York, N. Y., a corporation of New York Application August 6, 1938, Serial No. 223,557

13 Claims. (Cl. 136—4)

This invention relates to electrical devices and methods of manufacture and more particularly to thermocouple devices for measuring electrothermal properties and conditions of material and apparatus.

An object of the invention is to facilitate the measurement of temperatures at ultra-high frequencies.

Another object of the invention is to produce a compact and efficient thermocouple having stable characteristics.

A further object of the invention is to prevent oxidation of the thermocouple elements during manufacture.

In accordance with one aspect of this invention as applied to a measuring device, a thermocouple comprises an evacuated shell having a plurality of leading-in conductors sealed therein and a thermocouple mount within the shell and supported by the conductors. This arrangement forms a compact unit in which the conductors are relatively short and of low capacity to insure accurate measurements at ultra-high frequencies.

It is also contemplated by this invention to assemble the thermocouple mount in the shell subsequent to the sealing operation of the conductors in the shell wall.

In accordance with this feature the mount comprises a unit formed of an insulating disc to which is attached spaced tubular terminals which carry the thermo-responsive elements which are coupled together. The conductors are sealed between two half sections of a glass shell and extend radially therefrom.

After the sections of the shell are joined together with the conductors in position, the unit is inserted through the open half of the shell and the tubular terminals embrace the inner ends of the conductors and are attached thereto. This arrangement protects the delicate thermo-responsive elements from oxidation which would result if the unit is attached to the conductors during the fusing of the glass to form the seals for the conductors.

Another feature of this invention relates to the closure of the open section of the shell after the unit is mounted in position without danger of oxidation of the thermocouple elements. This is accomplished by arranging the mount in position so that the insulating disc forms a shield between the sensitive elements and the heat generated during the sealing of the open section of the shell.

An additional feature relates to the injection of an inert or non-oxidizing gas into the shell during the sealing operation when the mount is located therein to prevent oxidation of the elements by convected heat.

These and other desirable features of the invention will be more clearly understood from the following detailed description and the accompanying drawing:

Fig. 1 is an enlarged perspective view of the device made in accordance with this invention with a portion of the vessel broken away to illustrate the internal elements;

Fig. 2 is a plan view of the device of Fig. 1 with a portion of the shell shown in cross-section;

Fig. 3 is an enlarged perspective view of the thermocouple mount embodied in this invention;

Fig. 4 is an enlarged view in cross-section of some of the details of the mount and the conductors;

Fig. 5 shows in cross-section the preliminary step in the process of this invention for the fabrication of the device;

Fig. 6 illustrates the second step of the process with the mount placed in position; and Fig. 7 shows the configuration of the device after the completion of the step of Fig. 6.

Referring to the drawing, the thermo-sensitive device of this invention includes a highly evacuated vessel or shell of vitreous material formed of two half sections 10 and 11 joined together at a peripheral flange portion 12 and a couple mount 13 supported therein by a plurality of radial conductors 14, 15, 16 and 17 sealed through the flange portion 12 of the shell.

The thermocouple mount 13 comprises an insulating disc 18, such as mica, which is provided with tubular metallic terminals or sockets 19 extending through the disc. These terminals, in accordance with one form of the invention, as shown more clearly in Fig. 4, are formed of twin eyelets 20 and 21 having their flanges 22 and 23 joined together and the eyelet 20 is slotted on opposite sides to provide ears 24 and 25. The slotted eyelet 20 extends through an aperture in the disc 18 so that the flange joints abut one surface of the disc and the terminal is secured to the disc by pressing down the ears 24 and 25 in contact with the opposite surface of the disc. As shown in Fig. 2 the terminals are offset in a counter-clockwise direction from a diametrical line across the disc and a transverse line which bisects it. This arrangement insures accurate reticulation of the thermocouple elements and also provides a clear passage for the entrance of the supporting conductors.

The thermocouple elements comprise a wire section 26 having a high temperature coefficient, such as "constantin," joined to a stub wire 27 which is attached to a tubular eyelet associated with conductor 14, and a wire section 28 having a low temperature coefficient, such as iron wire, joined to a stub wire 29 associated with conductor 16. These wire sections are joined together at the center so that they extend coextensively with a diametrical line across the disc 18 passing through the axis thereof. The two oppositely disposed terminals 19 are provided with angular shaped stub wires 30 and 31 which extend upright along the sides of the terminals. A heater element 32, such as tungsten, carbon or Nichrome wire, is joined to the upper ends of the wires 30 and 31 and the center point is connected at the junction of the wire sections 26 and 28. The heater wire 32 is disposed oblique from the center thereof while the wire sections 26 and 28 are horizontally disposed transverse with respect to the heater wire 32. This arrangement insures stable calibration of the thermocouple element and facilitates efficient assembly of the unitary mounting of the device. Furthermore the fabrication of the details constituting the mount of the invention increases mass production and materially decreases the cost of assembly.

The device of this invention is adapted for temperature measurements in which the thermocouple produces a thermal electromotive force when the junctions of the elements are at different temperatures and this property is of particular importance in systems operating in the ultra-high frequency range where a fluctuating temperature component may affect the characteristic of related apparatus.

In accordance with this invention, the thermocouple elements may be calibrated for a definite temperature range and this calibration will be maintained stable throughout the use of the device due to low loss introduced by the short lead-in conductors connected to the mount. This is accomplished by sealing the conductors radially in the flange of the shell so that the inner ends are bent at right angles, as shown at 33 in Fig. 4, with the shank ends secured to the eyelet 21 and the bend of the conductor seated in the slotted eyelet 20. This arrangement materially reduces the resistance and capacity effects on the thermocouple elements and therefore secures a stable measurement of temperature within the prescribed limits.

In order to achieve this low loss advantage and at the same time facilitate the assembly of the device without affecting the close operating limits of the elements by oxidation which would impair the fine wire elements, a novel process of assembly is produced by this invention so that the elements are completely protected from deleterious oxidation particularly during the fusing of the glass shell to hermetically seal the leading-in conductors in the flange 12. Figs. 5 to 7, inclusive, illustrate the various steps of the process for fabricating the assembly of the device of this invention to accomplish the purposes set forth above.

Referring to Fig. 5 the preliminary step of the process comprises the mounting of all the preformed conductors in a gauge 34 which is mounted on a standard or holder 35. It will be seen that the shank end 33 of the conductor fits into an aperture 36 of the gauge while the bend and radial portions of the conductor are seated in a radial slot 37, as shown for the conductors 15 and 17. The gauge with the assembled conductors is fitted between a shell section 10 and a cylindrical glass member 38, each having a flared end 39 which is in contact with the radial portions of the conductors. The glass worker then proceeds to fuse the glass to hermetically seal the conductors therein and join the section 10 and member 38 together to produce the flange portion 12. After the assembly is sufficiently cooled the gauge 34 is removed through the cylindrical member 38.

The mount 13, completely assembled as previously described, is inserted into the member 38 with the elements facing toward the tubulation 39 in the shell section 10. Since the slots formed in the eyelets 20 of the mount are clear, the shank ends of the conductors easily enter the eyelets due to the predetermined location of the conductors by the gauge and the correlation of the eyelets to accommodate the conductors. When the mount is fixed in position, as shown in Fig. 6, the lower eyelets 21 are rigidly secured to the shank ends 33, for instance by welding. It is realized that the delicate elements of the thermocouple are not subjected to the oxidizing atmosphere present during the sealing of the conductors in the glass shell due to the fact that the mount is not associated with the shell or conductors during the sealing operation.

Fig. 6 shows a subsequent step in the process of the invention, whereby the cylindrical glass member 38 is closed to form the lower section 11 of the shell. In performing this step it is necessary to heat the glass cylinder 38 with gas flames from burners 40 to render the glass plastic so that the glass may be shaped as shown in Fig. 7. The oxidizing flame may injure the elements supported on the mount, but in accordance with the invention, this difficulty is overcome by the shielding effect of the insulating disc 18 which serves as a baffle between the elements and the flame and additional precautions are taken by injecting a gas, such as nitrogen, argon or any other inert gas, into the enclosure of the shell through the tubulation 39. This gas offsets any oxidizing action in the shell during the collapsing of the cylinder 38 and also aids in shaping the section 11 by the regulation of the gas pressure within the shell. After these steps are completed the tubulation 39 may be connected to the usual header of a pumping station to remove traces of the inert gas and to create a high vacuum in the shell whence the tubulation may be sealed off as shown in Fig. 1.

While the invention has been described in connection with a thermocouple device, particularly for use in the ultra-high frequency range, it is, of course, understood that the device is not limited to this field. Furthermore, it is also within the purview of this invention to assemble other elements or electrodes on the mount in place of the thermocouple elements to embrace structures for use in modulating and amplifying ultra-high frequency currents in which the advantages of this invention may be utilized in producing high efficiency in manufacture and operation. Furthermore, various modifications will be readily suggested in accordance with this disclosure and therefore the invention should only be limited within the scope of the appended claims.

What is claimed is:

1. An evacuated device including an enclosing vessel, a unitary mount within said vessel, leading-in conductors extending through the side wall of said vessel, said conductors having bent end portions within said vessel extending parallel to the longitudinal axis thereof, tubular terminals on said mount connected to said bent end portions of said conductors, and thermocouple and heater elements supported by said terminals and extending over the area of said mount.

2. An evacuated device including an enclosing vessel, a unitary mount within said vessel, leading-in conductors extending through the side wall of said vessel toward the center thereof, said conductors having bent end portions in said vessel extending parallel to the longitudinal axis thereof, tubular terminals on said mount, thermocouple and heater elements connected to and extending between said terminals, and means attached to said terminals for supporting said mount by said conductors.

3. An evacuated device including an enclosing vessel, a unitary mount within said vessel, leading-in conductors extending through the side wall of said vessel in a substantially radial direction, said conductors having bent end portions within said vessel extending parallel to the longitudinal axis thereof, tubular terminals on said mount having slotted portions in alignment with said conductors, thermocouple and heater elements supported by said slotted portions and extending over said mount substantially parallel thereto, and extensions on said terminals embracing said bent end portions.

4. An evacuated device including an envelope, a unitary mount within said envelope, leading-in conductors extending through the wall of said envelope, said mount including a disc, twin eyelet terminals having abutting flange portions adjacent one side of said disc and a slotted portion extending beyond the other side of said disc, said slotted portions being transverse to and in alignment with said conductors, a thermocouple wire extending between oppositely disposed therminals on one side of said disc a heater wire engaging said thermocouple wire and attached to the remaining terminals, and means on said conductors seated in said slotted portion of said terminals.

5. A measuring device including a hollow vessel, a unitary mount within said vessel, leading-in conductors extending through the side wall of said vessel toward the center thereof, said mount including a disc, a plurality of eyelet terminals, said terminals being secured to said disc in offset positions near the periphery thereof, said conductors being seated in said terminals, and thermocouple and heater elements supported in intersecting relation by said terminals, said elements extending along lines coextensive with diametrical lines passing through the axis of said disc.

6. A measuring device comprising a shell type vessel formed of two half sections, the abutting edges of said sections forming an annular rim, a plurality of conductors sealed in said rim and extending within said vessel, said conductors having their inner ends bent at right angles, a mount within said vessel including a mica disc, tubular eyelet terminals secured to said disc and registering with the bent ends of said conductors, and a thermocouple and a heater wire supported by said terminals and connected together at the center.

7. A measuring device comprising a shell type vessel formed of two half sections, the abutting edges of said sections forming an annular rim, a plurality of conductors sealed in said rim and extending within said vessel, a mount within said vessel including a mica disc, terminals associated witih said disc, each of said terminals being formed of aligned eyelets having abutting flanged portions engaging one side of said disc and ear portions engaging the other side of said disc, said terminals being arranged at the corners of a rectangle, one opposed pair of terminals supporting a heater element therebetween, and the other pair of opposed terminals supporting thermocouple elements extending toward said heater element, said thermocouple and heater elements being connected together at their junction point, and means for seating said conductors in said terminals to support said mount closely parallel to said conductors.

8. An electrical device comprising a hollow enclosing vessel, a mount within said vessel, a plurality of leading-in wires sealed through the side wall of said vessel and connected to said mount, and a plurality of thermo-electric measuring elements and a heater wire supported by said mount in crossing relationship and linearly connected to said leading-in wires.

9. An electrical device comprising a hollow enclosing vessel, a mount within said vessel, a plurality of leading-in wires sealed through the side wall of said vessel and connected to said mount, and a plurality of thermo-electric measuring elements and a heater wire supported in intersecting relation on one side of said mount and electrically connected to said leading-in wires.

10. A thermocouple device comprising a hollow enclosing vessel, a mount within said vessel, a plurality of leading-in wires sealed through the side wall of said vessel and connected to said mount, and a plurality of thermo-electric elements carried by said mount, one of said elements being a heater wire electrically connected to two oppositely disposed leading-in wires, and the other element being formed of a plurality of wires having connected at their outermost ends to the remaining leading-in wires and at their innermost ends to the center of said heater wire in a radial plane transverse to the vertical plane of said heater wire.

11. A thermocouple device comprising a hollow enclosing vessel, an insulating disc within said vessel, a plurality of tubular eyelets secured to said disc in spaced relation, a plurality of leading-in wires sealed through the side wall of said vessel and having bent portions extending through and secured to said eyelets, angular wires secured to said eyelets and extending beyond one side of said disc, and a thermocouple wire and a heater wire attached to said angular wires and being joined in thermal relation at the center.

12. A measuring device comprising a hollow enclosing vessel, a mount including thermocouple and heater elements within said vessel, a plurality of leading-in wires extending through said vessel in a horizontal plane and having portions therein extending in one direction transverse to said wires, said mount being in a plane parallel to said wires, and hollow contact members supporting said elements on said mount in embracing engagement with said portions.

13. A mount adapted to be enclosed in an evacuated vessel having conductors sealed therein comprising an insulating member, a plurality of bi-part tubular terminals attached thereto, said terminals having a slotted portion on one side of said member for the reception of said conductors and sleeve portions on the other side of said member for securing said terminals to said conductors, and thermocouple and heater elements extending over said member supported by said slotted portions and being connected together at the center of said elements.

JOHN W. WEST.